United States Patent [19]

Howell, Jr. et al.

[11] 4,227,970
[45] Oct. 14, 1980

[54] SOLAR DISTILLATION APPARATUS

[75] Inventors: Alexander G. Howell, Jr.; Evan E. Settle, III, both of Richmond, Va.

[73] Assignee: Reynolds Metals Company, Richmond, Va.

[21] Appl. No.: 784,586

[22] Filed: Apr. 4, 1977

[51] Int. Cl.³ .............................................. B01D 1/00
[52] U.S. Cl. .................................... 202/234; 203/86; 202/266
[58] Field of Search ............. 203/DIG. 1, 86; 159/15; 202/234, 83, 266; 126/415, 427

[56] References Cited

U.S. PATENT DOCUMENTS

| | | | |
|---|---|---|---|
| 102,633 | 5/1870 | Wheeler et al. | 203/DIG. 1 |
| 3,072,920 | 1/1963 | Yellott | 203/DIG. 1 |
| 3,655,517 | 4/1972 | Hensley, Jr. | 202/234 |
| 4,137,901 | 2/1979 | Maier | 203/DIG. 1 |

Primary Examiner—Hiram H. Bernstein
Attorney, Agent, or Firm—Glenn, Lyne, Girard & McDonald

[57] ABSTRACT

A solar distillation apparatus is provided which employs at least one pan which is adapted to contain a distilland therein and which has its upper portion heated directly by solar radiant energy passing through a transparent cover disposed above the pan and has its lower portion at least partially heated by radiant energy reflected from a reflective inside surface comprising a bottom wall of the apparatus such that simultaneous heating of both the upper and lower portions of the distilland is achieved and results in a more efficient heating and the provision of vapors from such distilland which engage the bottom surface of the cover and condense thereon to define a distillant which because the apparatus and cover are disposed at an angle to a horizontal plane move under the influence of gravity along such bottom surface into a reservoir therefor. The pan is disposed above the reflective inside surface such that there is an ambient air space between the bottom of the pan and the reflective inside surface whereby there is a minimum heat loss from the distilland through the bottom of the pan due to the cooperating action of the air space and reflective surface.

21 Claims, 5 Drawing Figures

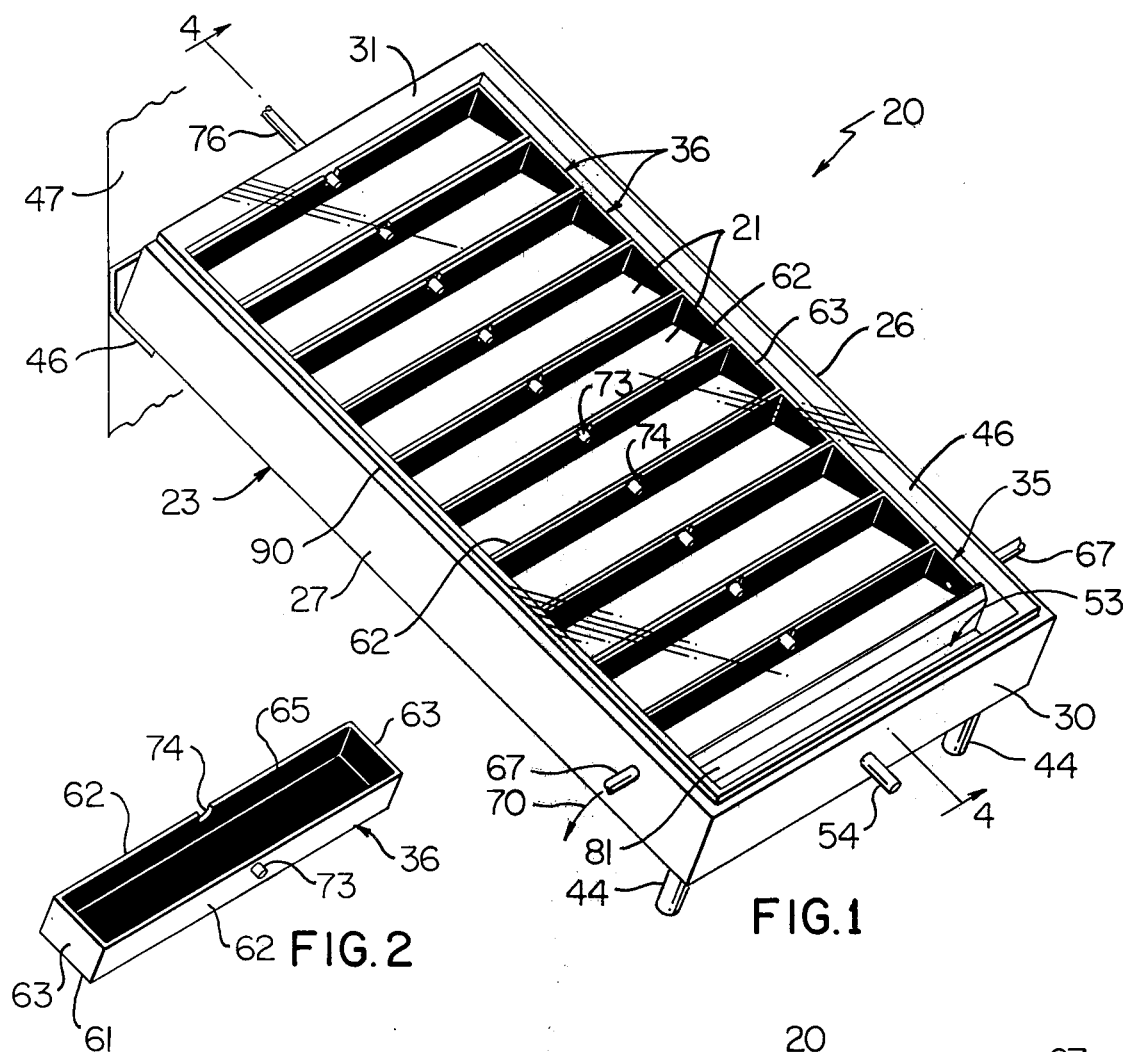
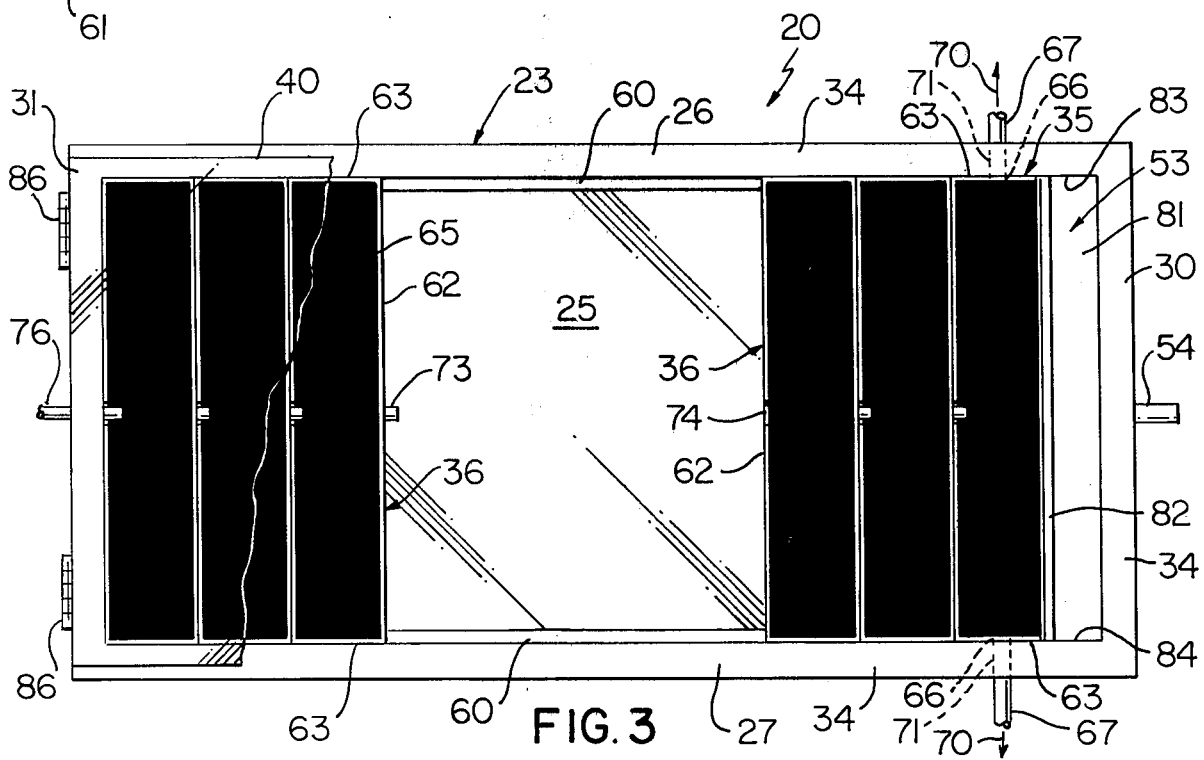

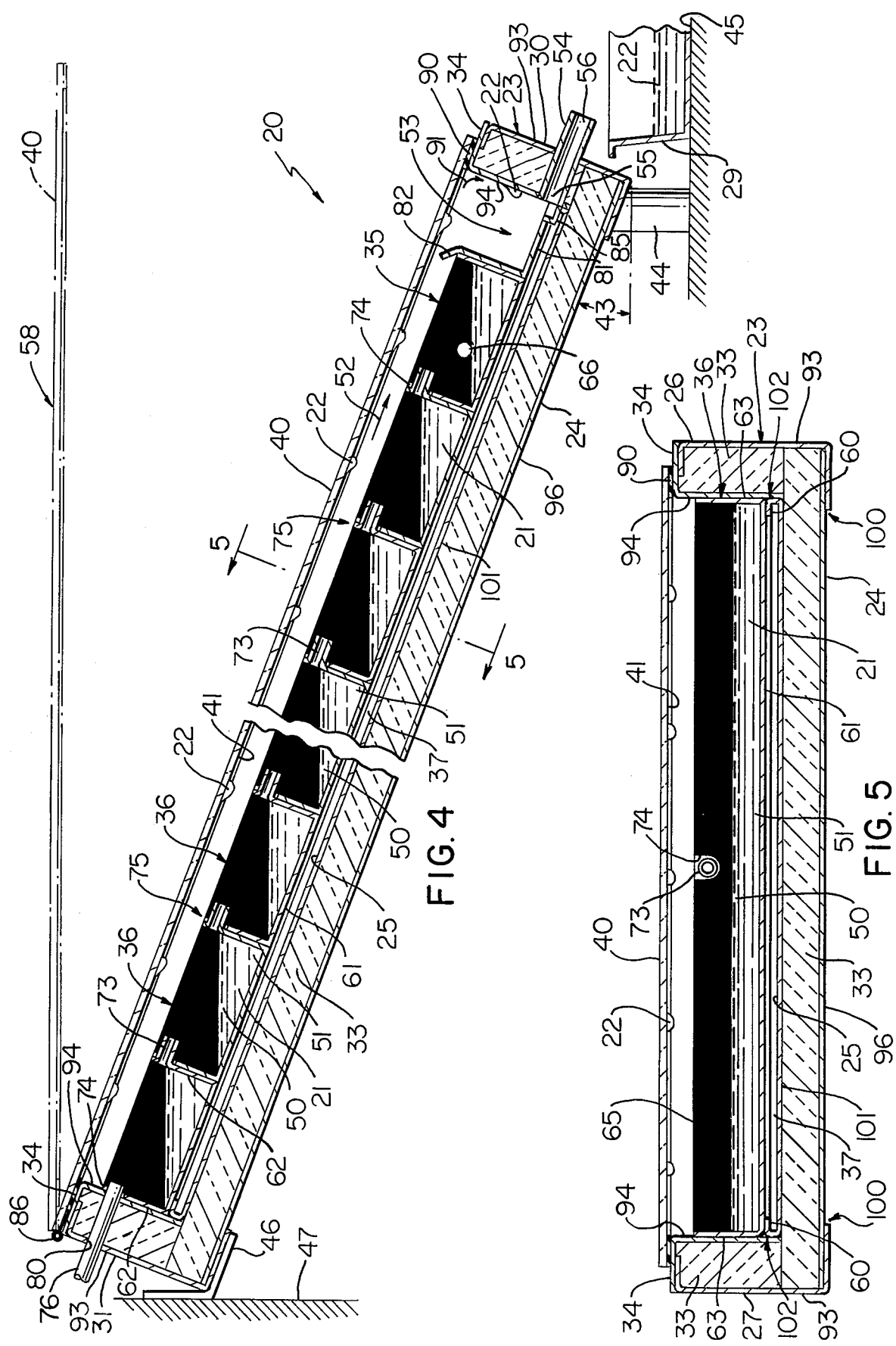

SOLAR DISTILLATION APPARATUS

BACKGROUND OF THE INVENTION

So-called solar stills for producing potable water from sea water, polluted water, brackish water, and the like, are well known in the art. However, in order to provide a satisfactory solar still or solar distillation apparatus it is important that such apparatus operate comparatively efficiently, be easy to clean and maintain in operating condition, and be inexpensive to produce; and, previously proposed solar stills are deficient in one or more of these mentioned items.

In an effort to reduce costs, solar stills have been proposed which have practically all of their structural and distilland containing components made primarily of synthetic plastic materials; however, the plastic components of such stills when subjected to extended elevated temperatures and ultraviolet radiation from the sun tend to deteriorate.

SUMMARY

This invention provides an improved solar distillation apparatus which basically overcomes the above-mentioned deficiencies.

In particular, the apparatus of this invention is made of comparatively inexpensive materials and is readily usable in ambient air to convert sea water, polluted water, brackish water, and the like to potable water; and, such apparatus utilizes materials which do not tend to deteriorate after prolonged exposure to the sun.

The apparatus employs at least one pan which is adapted to contain a distilland therein and which has its upper portion heated directly by solar radiant energy passing through a transparent cover diposed above the pan and has its lower portion at least partially heated by radiant energy reflected from a reflective inside surface comprising a bottom wall of the apparatus such that simultaneous heating of both the upper and lower portions of the distilland is achieved and results in a more efficient heating and the provision of vapors from such distillant which engage the bottom surface of the cover and condense thereon to define a distillant which because the apparatus and cover are disposed at an angle to a horizontal plane is adapted to move under the influence of gravity along such bottom surface into a reservoir therefor. The pan is disposed above the reflective inside surface such that there is an ambient air space between the bottom of the pan and the reflective inside surface whereby there is a minimum heat loss from the distilland through the bottom of the pan due to the cooperating action of the air space and reflective surface.

Other details and advantages of the invention will become apparent as the following description of the embodiment thereof in the accompanying drawings proceeds.

BRIEF DESCRIPTION OF THE DRAWINGS

The accompanying drawings show a present preferred embodiment of the invention, in which FIG. 1 is a perspective view of one exemplary embodiment of the solar distillation apparatus of this invention containing a distilland in a plurality of pans thereof and illustrating such apparatus in the process of producing a distillate from such distilland;

FIG. 2 is a perspective view of a typical one of the plurality of pans of the apparatus of FIG. 1;

FIG. 3 is a view looking perpendicularly toward a flat transparent hinged cover of the apparatus of FIG. 1 illustrating four centrally disposed pans removed from such apparatus;

FIG. 4 is a cross-sectional view taken essentially on the line 4—4 of FIG. 1 illustrating by dot-dash lines the hinged cover thereof in a raised position and also illustrating a container disposed at the base of the apparatus for collecting distillant therein; and FIG. 5 is a cross-sectional view taken essentially on the line 5—5 of FIG. 4.

DESCRIPTION OF ILLUSTRATED EMBODIMENT

Reference is now made to FIG. 1 of the drawings which illustrates one exemplary embodiment of a solar distillation apparatus of this invention which is designated generally by the reference numeral 20. The apparatus 20 is particularly adapted for use in ambient environmental conditions present at any location in which it is desired to use the apparatus 20, and for ease of presentation such ambient environmental conditions will be referred to as ambient air. The apparatus 20 is particularly adapted to produce potable water from a distilland such as polluted water, brackish water, sea water, or the like and in this disclosure of the invention reference will be made to the utilization of the apparatus 20 in distilling a distilland in the form of sea water and such distilland or sea water is designated by reference numeral 21 in FIG. 4. The distilland 21 is distilled to define the potable water or distillate which is designated by the reference numeral 22 and is collected in a suitable container 29 associated with apparatus 20. The detailed construction and operation of the apparatus 20 will now be described in detail.

As seen in FIGS. 1 and 3, the apparatus 20 comprises a boxlike structure which is designated by the reference numeral 23 defined by flat bottom wall 24 having a reflective inside surface 25 for reflecting radiant energy and a plurality of four adjoining enclosing peripheral transverse walls shown as oppositely arranged substantially identical side walls 26 and 27 and oppositely arranged end walls 30 and 31 shown as a lowermost end wall 30 and an uppermost end wall 31. As will be readily apparent from FIGS. 4 and 5 each of the walls 24, 26-27, and 30-31 is comprised of a thermal insulating material which is designated in each instance by the same general reference numeral 33 and each peripheral wall 26-27 and 30-31 has a top surface designated by the same reference numeral 34 and the surfaces 34 are disposed substantially in a common plane parallel to bottom wall 24 and hence to the reflective inside surface 25 thereof.

The apparatus 20 has pan means in the form of a plurality of elongated pans including a lowermost pan 35 and a plurality of substantially identical pans disposed thereabove and such identical pans are designated by the same reference numeral 36. The pans 35-36 are disposed in adjoining side-by-side relation and supported with their elongated dimensions perpendicular to the side walls 26 and 27, see FIG. 4. The pans 35 and 36 are mounted in spaced relation above the inside surface 25 so as to define a thermally insulating air space 37 between the pans 35-36 and the inside surface 25.

The apparatus 20 has a flat transparent cover 40 disposed parallel to flat bottom wall 24 and its planar inside surface 25 and cover 40 has a bottom surface 41 supported by the top surfaces 34 the walls 26–27 and 30–31 of the box-like structure 23. The structure 23 is adapted to be supported at an inclined angle 43 to a horizontal plane as shown in FIG. 4, so that the cover 40 is disposed at a corresponding inclined angle; and, in this example of the invention it will be seen that the box-like structure is supported on a pair of vertical support posts 44 which may be fixed at their top ends to the lowermost wall 30 and may have their bottom end portions supported on the ground which is designated by the reference numeral 45. The upper end of the box-like structure 23 and hence the upper end of the apparatus 20 has a suitable support bracket 46 detachably fixed thereto and the bracket 46 is suitably fastened to a support structure 47 such that the end wall 31 is disposed a substantial vertical distance above the end wall 30 to define the inclined angle 43 for the boxlike structure and the corresponding identical inclined angle 43 for the cover 40 and its bottom surface 41 and for a purpose which will be readily apparent from the description to be presented subsequently.

The pans 35–36 are adapted to contain the distilland 21 therein and the distilland 21 has its upper portion 50 heated directly by solar radiant energy passing through the transparent cover 40 and has its lower portion 51 at least partially heated by radiant energy reflected from the reflective inside surface 25. This simultaneous heating in two directions results in more efficient heating of the distilland 21 and the provision of vapors from such distilland or sea water 21 which engage the bottom surface 41 of cover 40 and condense thereon due to the cooling action produced by the surrounding ambient air to define beads or droplets of the distillate or potable water 22 which cling to the inclined surface 41 and are adapted to and in fact move under the influence of gravity along bottom surface 41 as indicated by the arrow 52 in FIG. 4 toward and into a reservoir 53 provided at the lower end of the boxlike structure and thus at the lower end of the apparatus 20. The reservoir or tank 53 has an outlet pipe 54 which has an inlet end 55 in flow communication therewith and the pipe 54 extends through the wall 30 and has an outer end 56 which extends beyond the wall 30 enabling distillate 22 from reservoir 53 to flow into the container 29.

As indicated previously, the bottom wall 24 has a reflective inside surface 25 and such surface is a dual-purpose surface. In particular, the reflective inside surface 25 serves to reflect radiant energy and provide heating of the lower portion 51 of the distilland. In addition, the inside surface 25 cooperates with the thermally insulating air space 37 disposed thereabove to assure minimum conductive heat loss from the pans 35 and 36 through the bottom wall 24 of the apparatus 20.

The apparatus 20 has a pair of pan supports each designated by the reference numeral 60 and each adjoining an associated inside surface of a sidewall 26 or 27; and, the pan supports 60 are adapted to support opposite end portions of the elongated pans 35 and 36. The construction and arrangement of the walls 26–27 and 30–31 is such that a plurality of pans, ten in this example, are readily disposed in side-by-side relation with the opposed end portions of pans 35–36 supported on pan supports 60 and with the walls 26–27 and 30–31 confirming the pans 35–36 in a nesting relation against movements parallel to the flat bottom wall 24.

The pans 35–36 may be made of any suitable comparatively rigid material known in the art and each is preferably made of a metallic material such as an aluminous material whereby the pans are capable of withstanding substantial wear and abuse during usage. It will be appreciated that the pans 35 and 36 are easily installed and removed for cleaning, maintenance, and the like simply by lifting the cover 40 (employing hinge means to be subsequently described) from the solid line position illustrated in FIG. 4 to a position thereof which is roughly perpendicular to the bottom wall 24. The cover is shown by dot-dash lines in FIG. 4 in a partially lifted position at 58.

Each pan 35 and 36 is basically in the preferred form of an open top parallelopiped defined by a flat bottom 61, a pair of side walls each designated by the same reference numeral 62, and a pair of end walls each designated by the same reference numeral 63, see FIG. 2 for a typical pan 36. In addition, each pan 35 and 36 preferably has a blackened inside surface 65; and, such blackened inside surface is defined as the inside surface of the pan bottom 61 and the four vertical walls 62–63 thereof. The blackened inside surface assures absorption of solar energy or heat at a maximum rate.

Referring again to FIGS. 1 and 3 of the drawings the lower pan 35 has at least one distilland overflow opening therein and in this example of the invention such pan 35 has a pair of openings in its opposite ends 63 with each opening being designated by the same reference numeral 66. Each opening 66 is adapted to receive a distilland overflow spout in the form of a pipe 67 therethrough such that once distilland 21 reaches the level of openings 66 such distilland flows out of the overflow pipes 67 as shown by arrows 70 in FIG. 3. Each overflow pipe 67 extends through an associated opening 71 in an associated side wall, either 26 or 27, and the inner end of each overflow pipe 67 is sealed in fluid flow communication with the pan 35 by any suitable means. For example, each pipe 67 may have a threaded end which is threadedly received in an associated opening which may be correspondingly threaded.

Each pan 36 has a distilland overflow spout 73 provided in one of its four vertical walls and in this example such overflow spout 73 is provided in its forwardly, i.e., in the direction of distillate flow, disposed side wall 62. Each pan 36 also has a slot 74 in its rearwardly disposed side wall 62 so that with the pans 35 and 36 installed in position in the apparatus 20 each overflow spout 73 is received in a slot of a pan 36 disposed therebeneath and as shown at a typical location 75 in FIG. 4. It will also be seen that the lowermost pan 35 also has a slot in its rearwardly disposed wall 62 and for simplicity and ease of presentation such slot is also designated by the reference numeral 74. Thus, it is seen that except for the distilland overflow spouts the pans 35 and 36 are substantially identical. Further, pans 35–36 may be made basically interlocking with each other with each spout 73 designed such as to be received in slot 74 and provided with any suitable downwardly extending projection which engages an associated wall 62 beneath its slot 74.

The apparatus 20 has an inlet pipe 76 for introducing distilland, sea water in this example, into such apparatus; and, the inlet pipe 76 extends through an opening 80 in the end wall 31 and through an associated slot 74 of the uppermost pan 36 so as to introduce the distilland into the uppermost pan 36. Once the uppermost pan is filled (to the level indicated in FIG. 4) the distilland flows through the overflow spout 73 into the next lower pan 36 and the filling process is repeated successively downwardly through the pans 36 until all identical pans 36 are filled with distilland 21 including the pan 36 adjoining the lowermost pan 35. Once such adjoining pan 36 is filled, distilland 21 overflows its spout 73 filling the lowermost pan 35 until the level of distilland 21 therein reaches the level of and flows from the overflow pipes 67.

As previously mentioned the apparatus 20 has a distilland collector reservoir 53 provided in the lower portion thereof and the reservoir 53 will now be described in detail. The reservoir 53 is an open-top reservoir 53 comprised of a roughly L-shaped member 81 which extends across the full width of the apparatus 20 between its side walls 26 and 27 and has opposite end edges sealed against walls 26-27. The L-shaped member has a backwardly inclined portion 82 which serves as a stop for the lowermost pan 35. The L-shaped member 81 cooperates with lower inside surface portions 83 and 84 of the side walls 26 and 27 and an inside surface of the end wall 30 to define the reservoir 53 for collecting distillant or potable water 22. It will also be noted that a transition piece 85 is provided at the inlet end of pipe 54 to insure communication of the inlet end 55 of pipe 54 with the reservoir 53. It will be appreciated that suitable seal means are provided between the various components (as by welding, or the like) to assure that the reservoir 53 is liquid tight and distilled potable water 22 flows readily out of the reservoir 53 into container 23.

The cover 40 of apparatus 20 is a transparent cover 40 which is made of any suitable transparent material capable of passing radiant energy from the sun therethrough; and, such cover may be made of glass, plastic, or the like. The cover 40 is preferably in the form of a hinged cover which is hingedly attached by hinge means to the box-like structure 23. The hinge means may be of any suitable type and in this example are shown as a pair of spaced apart hinges, each designated by the same reference numeral 86. Each hinge 86 may be of known conventional construction and is detachably fixed to the end wall 31 and to the cover 40; and, the hinges 86 allow the cover 40 to hingedly be pivoted thereabout for installation and removal of pans 35-36 for all purposes.

The apparatus 20 may be provided with suitable seal means or a gasket-like seal between the bottom surface 41 of the cover 40 and the coplanar surfaces 34 of the walls 26-27 and 30-31. Although any suitable seal may be provided for this purpose such seal is preferably in the form of an elastomeric seal which is designated by the reference numeral 90 and may be made of any suitable annular strip of rubber or plastic material which is suitably bonded to either the top surfaces 34 or the periphery of the bottom surface 41 of cover 40. The seal 90 assures that the distillant 22 flowing by gravity along the bottom surface 41 of the cover 40 remains within the confines of such seal; and, with seal 90 engaging the top surface 34 of the wall 30 the distillant flows by gravity into the reservoir 53 as shown by the arrows at 91 in FIG. 4.

Except for the cover 40, support posts 44, and bracket 46, the apparatus 20 is basically a flat easily stored and transported tray-like apparatus having a substantial length, a width which may be shorter than its length, and a vertical dimension or height which is several times less than its width. Further, such basic apparatus is in the form of a parallelopiped defined by side walls 26-27, end walls 30-31, bottom wall 24 and cover 40.

Each wall 24, 26-27, and 30-31 is a substantially rigid wall made of a high strength housing having the insulating material 33 suitably disposed therewithin and it will be appreciated that the thermal insulating material 33 may be of any suitable type employed in the art. In this example each wall has insulating material of roughly the same thickness defining such wall.

The housing portions of the various walls 24, 26-27, and 30-31 may be made in any suitable manner known in the art; however, for simplicity and economy of construction the outer housing portions of peripheral walls 26-27 and 30-31 are made of U-shaped members 93 of similar cross-sectional configurations while the inner housing portions of peripheral walls 26-27 and 30-31 are made of L-shaped members 94 of similar cross-sectional configuration. Each member 94 has one leg thereof provided with a surface defining an associated surface 34. Thus, only two basic structural members 93 and 94 are used and such members are fixed together using any technique known in the art, such as welding, for example, to define their associated walls. The bottom wall 24 is defined by a bottom plate or sheet member 96 supported on the inside surfaces of associated legs of the U-shaped members 93 as shown at 100, for example, and a sheet member 101 fixed in parallel spaced relation to member 96. The member 101 has integral inwardly curved L-shaped portions which define the pan supports 60 previously described and as shown at 102. Accordingly, the pan supports are defined as an integral part of sheet-like member 101 of the bottom wall 24.

The member 101 is of substantial thickness and has the reflective inside surface 25 defined thereon as a polished or highly reflective surface; however, it will be appreciated that the surface 25 need not necessarily be provided on member 101 as described above but may be provided as a suitable reflective coating or may be in the form of a metallic foil such as aluminum foil laminated against the member 101 to define the reflective inside surface 25.

The pans 35 and 36 of the apparatus 20 of this invention may be filled with distilland, such as sea water, employing manual control of distilland flow into the inlet pipe 76; however, it will be appreciated that any suitable automatic system may be provided to assure that the pans 35 and 36 are kept filled to a desired level as the distillation process continues with the apparatus 20 supported in open ambient air with solar energy impinging thereon.

While present embodiments of this invention, and methods of practicing the same, have been illustrated and described, it will be recognized that this invention may be otherwise variously embodied and practiced within the scope of the following claims.

What is claimed is:

1. A solar distillation apparatus for use in ambient air comprising, a box-like structure defined by a bottom wall having a reflective surface for reflecting radiant energy and a plurality of adjoining substantially rigid peripherally walls, said peripheral walls being comprised of a pair of opposed side walls and a pair of opposed end walls, each of said side walls and said end walls having portions made of U-shaped sections of similar cross-sectional configurations and inner housing portions made of L-shaped sections of similar cross-sectional configurations, each of said L-shaped sections having a leg defining a top surface, each of said outer housing portions being disposed with respect to one of said inner housing portions so as to define a high strength housing which characterizes one of said peripheral walls, there being a thermally insulating material contained within each such high strength housing; removable pan means mounted in spaced relation above said reflective surface and defining an ambient air space between said pan means and said reflective surface; a flat transparent cover having a bottom surface disposed parallel to said reflective surface and supported by said top surfaces; said structure being adapted to be supported at an inclined angle to a horizontal plane so that said cover is disposed at a corresponding inclined angle; said pan means being adapted to contain a distilland therein which has its upper portion heated by solar radiant energy passing through said cover and simultaneously has its lower portion at least partially heated by radiant energy reflected from said reflective surface with the simultaneous heating resulting in more efficient heating of said distilland and the provision of vapors from said distilland which engage said bottom surface of said cover and condense thereon due to cooling action produced by said ambient air to define a distillate which is adapted to move under the influence of gravity along said bottom surface; and a reservoir for collecting said distillate; said reflective surface cooperating with said air space thereabove to assure minimum conductive heat loss from said bottom wall.

2. An apparatus as set forth in claim 1 in which said bottom wall has said reflective surface defined as an inside surface thereof.

3. An apparatus as set forth in claim 2 in which said reflective inside surface is made of an aluminous material.

4. An apparatus as set forth in claim 1 in which said bottom wall is comprised of an outer substantially rigid housing portion and a thermal insulating material within the housing portion of said bottom wall.

5. An apparatus as set forth in claim 1 in which said pan means comprises a plurality of pans defined by a lowermost pan and a plurality of substantially identical and interchangeable pans disposed thereabove.

6. An apparatus as set forth in claim 5 in which each of said pans has a blackened inside surface which assures absorption of solar energy at a maximum rate.

7. An apparatus as set forth in claim 5 in which each of said pans has a flat bottom disposed substantially parallel to said bottom surface of said cover.

8. An apparatus as set forth in claim 7 further comprising a pair of cooperating supports each disposed adjacent an associated inside surface of an associated wall of one of said pair of opposed walls, said supports being adapted to support opposite end portions of said pans.

9. An apparatus as set forth in claim 1 in which said cover is made of a transparent glass material.

10. An apparatus as set forth in claim 1 in which said cover is made of a transparent plastic material.

11. An apparatus as set forth in claim 1 in which said cover is hingedly fastened at one end thereof to one of said peripheral walls.

12. An apparatus as set forth in claim 1 and further comprising seal means between said bottom surface of said cover and said top surfaces of said peripheral walls.

13. An apparatus as set forth in claim 5 in which each of said pans is in the form of an open top parallelopiped defined by a rectangular bottom adjoined by four vertical walls.

14. An apparatus as set forth in claim 13 and further comprising an overflow spout in one of said vertical walls of each of said identical pans, each of said overflow spouts serving as a means for transferring distilland from an upper one of said pans to one disposed immediately therebeneath.

15. An apparatus as set forth in claim 13 in which each of said pans has a cutout slot in one of its vertical walls, each cutout slot being adapted to receive a distilland overflow spout of a pan disposed thereabove.

16. An apparatus as set forth in claim 13 in which said lowermost pan and said identical pans each has a distilland overflow spout in a vertical wall thereof, and each of said pans has a cutout slot in a vertical wall thereof which receives a distilland overflow spout of a pan disposed thereabove.

17. An apparatus as set forth in claim 16 and further comprising means for introducing distilland into said pan means.

18. An apparatus as set forth in claim 1 in which one of said end walls defines a lowermost end wall, and said reservoir adjoins said lowermost end wall.

19. An apparatus as set forth in claim 18 in which said reservoir is comprised of a primarily L-shaped member cooperating with surface portions of said side walls and said lowermost end wall to thereby define said reservoir within the confines of said side walls and said lowermost end wall.

20. An apparatus as set forth in claim 19 and further comprising a distillate conduit from said reservoir through said lowermost end wall, said conduit being adapted to flow distillate from said reservoir to a container associated with said apparatus.

21. An apparatus as set forth in claim 20 and further comprising a pair of cooperating supports each disposed adjacent, one of said inner housing portions, said supports being adapted to support opposite end portions of said pans, said supports being defined as an integral part of said bottom wall.

* * * * *